Dec. 9, 1941.   J. A. MINER   2,265,951
ROTARY SHAFT SEAL
Filed March 29, 1940

Inventor
J. A. Miner
by
Attorney

Patented Dec. 9, 1941

2,265,951

UNITED STATES PATENT OFFICE 2,265,951

ROTARY SHAFT SEAL

John A. Miner, Springfield, Ill., assignor to Allis-Chalmers Manufacturing Company, Milwaukee, Wis., a corporation of Delaware Application March 29, 1940, Serial No. 326,578

8 Claims. (Cl. 286—11)

This invention relates to improvements in rotary shaft seals for protecting bearings from access thereto of foreign material and leakage of lubricant therefrom and particularly to seals employed for protecting the bearings of track rollers or wheels utilized in vehicles having ground engaging means of the crawler type.

The track or truck rollers of a track type vehicle are under a heavy load and require a high type of antifriction bearing which must be properly lubricated and protected from access thereto of abrasive material. The location of such truck wheels subjects the seals to particularly severe conditions due to dust raised by the track belt, mud carried over the rollers or actual immersion of the rollers in mud or muddy water. Tests have shown that a successful truck wheel seal can be produced only if attention is given to specific structural points such as the finishing of the contact surfaces to substantially plane surfaces and the lapping of the contacting surfaces of the two sealing members. Strain on either of the sealing surface members either during mounting or assembly or during operation must be prevented to avoid distortion of the plane surfaces. Torsion of the resilient member must also be entirely prevented to avoid such distortion of the resilient member as will draw the movable contact member away from or in any way disturb the position of the lapped portion of the movable contact member relative to the lapped portion of the fixed contact member. The movable contact member must be made with a sliding fit on the shaft or other part over which such contact member moves, to avoid displacement of the movable contact member in a lateral direction from the lapped position of the two contact members. The several contact members must be so shaped that the external surfaces thereof will not provide any crevices or grooves in which abrasive material might collect, and particularly adjacent the contacting surfaces, thus avoiding the entry of abrasive material between the contact surfaces upon any separation thereof. The external surfaces of the several seal parts must also be made so that there are no projections from the movable contact member and no configuration of any of the external surfaces which will permit pressures to act thereon in such manner as might cause separation of the contact surfaces.

It is therefore an object of the present invention to provide a seal for rotary shafts in which the contact surface members are formed with substantially plane and highly finished surfaces and are so floatingly mounted on the other portions of the seal structure as to avoid any distortion of the plane surfaces.

Another object of the invention is to provide a seal with a movable contact ring forming one of the sealing surfaces, so mounted and guided in its movement as to maintain a high degree of contact with the fixed contact plate.

Another object of the invention is to provide a rotary shaft seal in which the surfaces at the outer part of the seal are shaped without any leading-in crevice so as to avoid the entry of abrasive material between the sealing surfaces and are free of projections on which any forces might be set up by foreign material to cause separation of the sealing surfaces.

Another object of the present invention is to provide seals for track rollers of a track type vehicle in which lubricant is retained about the bearing within the roller and in which access of abrasive material to the bearing or to the oil supply therefor is effectively prevented.

Objects and advantages other than those above set forth will be apparent from the following description when read in connection with the accompanying drawing, in which.

Figure 4:
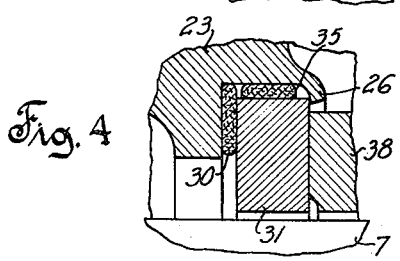

Fig. 4 is a view illustrating the manner of mounting the face plate 31 in the retainer 23 between a gasket 30 and the rolled-over edge 26 of the retainer.

Although the seal of the present invention has been illustrated as applied to a truck wheel for a track belt type vehicle and only one side of such wheel has been shown to avoid duplication of parts in the drawing, it will be understood that the seal may be applied to any rotary shaft in which it is required that the lubricant be maintained within the seal and that access of abrasive material to the bearings within the seal be avoided.

Referring to the drawing by characters of reference, the reference numeral 6 designates a bracket on which is mounted the usual truck frame (not shown) on which other portions of the machine are mounted and supported. The bracket 6 has mounted therein an axle 7 on which is mounted a known type of antifriction bearing shown as comprising an inner raceway 11, rollers 12 and an outer raceway 13. On the bearing is mounted a truck wheel including a hub portion 16, a web portion 17, a track portion 18 and a flange portion 19, the track portion 18 and flange portion 19 being so shaped and located as to contact with the usual track rail (not shown) on treads between the flanges. The bracket 6 and axle 7 comprise a stationary part which must be sealed to another part comprising the rotating wheel 17, 18, 19 spaced from the stationary part by bearing 11, 12, 13. The outer portion of the hub 16 is bored to provide a portion 21 which is screw threaded and which is immediately adjacent the portion of the hub in which the bearing is mounted and the extreme outer end of the hub 21 is formed with a bore 22 of such diameter as to leave only a relatively thin hub wall at the outer edge.

The hub bores 21 and 22 receive a retainer 23 in the form of a short externally threaded cylinder having an outwardly extending flange 25 and an inwardly extending flange 24 forming a counterbore in the outer end of the retainer. The retainer 23 is threaded into the screw threads in the inner surface of the hub portion 21 and abuts on the outer raceway 13 of the bearing to provide means for adjusting the raceway and hence the entire bearing as may be desired. After the bearing and retainer have been brought to the desired position, the retainer may be locked in such position by peening or rolling over portions of the end edges of the hub. A compressible and resilient gasket 27 is placed between the inner end of the hub bore 22 and the flange 25 of the retainer 23 to prevent leakage of the lubricant and access of abrasive material to the bearing through the joint between the hub and retainer. Retainer 23 receives an annular plate 31 of which the inner face may rest against the inner retainer flange 24 and which is peripherally spaced from the retainer. However, if the surface of flange 24 is not substantially perpendicular to the axis of axle 7, it is desirable to insert a resilient gasket 20 between the flange and plate 31 to avoid any possibility of distortion of the plate due to inaccuracy in manufacture of the retainer. Plate 31 is formed with an outer face finished with a polished substantially plane surface and preferably with a groove in the periphery of the plate to receive a substantially toroidal ring 32, preferably of compressible and resilient material, which will engage the surfaces of the retainer 23 with sufficient friction to hold the plate 31 floatingly in place and yet will permit tilting of the plate if required. The plate 31 is spaced from retainer 23 and is held only by frictional engagement of the retainer surface with ring 32 which distorts to compensate for pressure on the plate.

Bracket 6 is provided with an extension 36 projecting toward the hub of the wheel from approximately the upper half portion of the bracket and defining a space between the end of the bracket and the face plate 31, which extension guards the space below it from large masses of material which otherwise might drop into the space. The end of the bracket 6 is formed with a groove in which is fastened one end of a tube 37 of resilient material which is impervious to dust and moisture and is relatively unaffected by grease or heat. The other end of the tube 37 is likewise fastened in a groove in a ring 38 which has a close but freely sliding fit on the axle 7 and is formed with a carefully finished plane face. The finished face of the ring 38 is pressed against the finished face of the plate 31 by the expansive force of the tube 37 which is of such length as to be slightly compressed when all of the seal parts are in the position shown in the drawing.

It will be observed that the periphery of ring 38 is ground to a sharp edge with the face thereof to avoid the formation of any groove or crevice in which dirt may collect adjacent the contacting surfaces of plate 31 and ring 38 to pass between such surfaces if separation thereof should take place. The ring 38 is also formed without any projections on which external forces might act to separate the contacting surfaces and such surfaces are substantially enclosed by the retainer 23. The axle 7 is provided with a plurality of keys 39 projecting therefrom and extending axially of the axle. The keys 39 engage in splines formed in the inner surface of the contact ring 38 to provide means for preventing rotational movement of the ring while permitting axial movement thereof.

Figure 1:
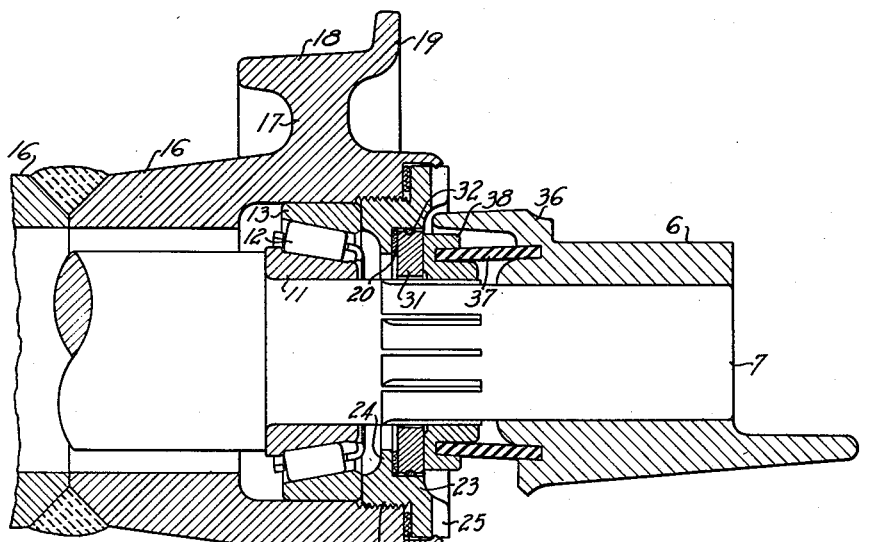
Fig. 1 is a cross-sectional view of one side of a track roller to illustrate the mounting of the roller on an antifriction bearing and to illustrate the application of one type of seal to such rollers.
Figure 2:
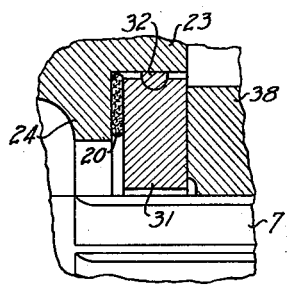
Fig. 2 is an enlarged view of a portion of Fig. 1 to illustrate the floating mounting of the face plate 31 spaced within the retainer 23 by a substantially toroidal gasket in the periphery of the face plate and resting on an annular gasket in the retainer.
Figure 3:
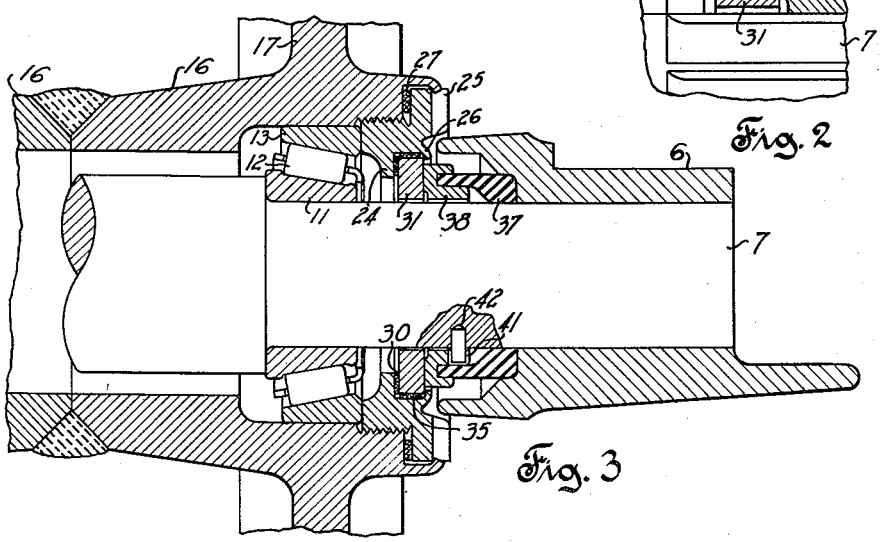
Fig. 3 is a view similar to Fig. 1 but showing a modified form of the seal.

In the modification shown in Fig. 3, the retainer 23 is provided with a third flange 26 which is peened or rolled over the face plate 31 to hold the plate floatingly in position on a gasket 30 located between it and the flange 24 of the retainer without, however, exerting any pressure on the plate and on gasket 35 about the periphery of the plate. The gasket 30 is compressible and resilient to hold plate 31 away from retainer flange 24 and to press the plate forwardly against retainer flange 26. Sufficient space is left between the periphery of plate 31 and the inner surface of the retainer to allow insertion of the resilient ring or gasket 35 which prevents rotation of and permits free positioning of the plate in the retainer. The tube 37 is secured in a groove formed by the coaction of the bracket 6 and the shaft 7 to simplify assembly of the seal. The seal ring 38 is provided with a plurality of V-notches 41 pointed toward the face plate 31 and engaging with pins 42 set radially into the axle 7. Any excessive friction between the face plate 31 and the seal ring 38 which might have a tendency to twist the tube 37 by a slight amount is resisted by engagement of the V-notches 41 and the pins 42 and is made to serve the beneficial purpose of causing axial movement of the seal ring which forces the seal ring against the face plate with a greater pressure and in turn limits the tendency of the tube to twisting.

It will thus be seen that the present invention provides a seal in which there is no distortion of the face plate 31 while setting the same into the retainer and in which the seal plate and ring are able to adjust themselves to each other to produce a uniform pressure therebetween and thus to minimize wear and provide both a liquid and dust tight seal between the exterior and interior of the wheel hub. From the present construction it is also impossible for insufficient lubrication between the sealing surfaces to produce a destructive torque on the sealing tube. Any tendency for the production of such torque will merely act to produce a greater pressure of the sealing surfaces on each other.

Although but two embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In a seal for the joint between relatively moving parts, a plate having a contact face and being floatingly mounted in the one said part to preserve the face in substantially a true plane, a resilient tube mounted at one end on the other said part and extending toward said plate, and a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

2. In a seal for the joint between relatively moving parts, a plate having a contact face in substantially a true plane and being mounted in the one said part, a resilient gasket spacing said plate from the one said part for floatingly mounting said plate to preserve the contact face thereof in substantially a true plane, and a resilient tube mounted at one end of the other said part and extending toward said plate, and a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

3. In a seal for the joint between relatively moving parts, a plate having a contact face in substantially a true plane and being mounted in the one said part, a resilient gasket engaging the periphery of said plate and frictionally engaging in the one said part for floatingly mounting said plate to preserve the contact face thereof in substantially a true plane, a resilient tube mounted at one end on the other said part and extending toward said plate, and a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

4. In a seal for the joint between relatively moving parts, a plate having a contact face and being floatingly mounted in the one said part to preserve the face in substantially a true plane, a resilient tube mounted at one end on the other said part and extending toward said plate, and a ring having a contact face and being attached to the free end of said tube to hold the face of said ring into contact with the face of said plate, the contacting faces of said plate and said ring being substantially coextensive and one of said faces extending outwardly beyond the other of said faces and being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

5. In a seal for the joint between relatively moving parts, a plate having a contact face and being floatingly mounted in the one said part to preserve the face in substantially a true plane, a resilient tube mounted at one end on the other said part and extending toward said plate, and a ring having a contact face and being attached to the free end of said tube to hold the face of said ring into contact with the face of said plate, the outer peripheral surface and the contact face of said ring intersecting at an angle up to 90 degrees to each other to form a sharp scraping edge, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

6. In a seal for the joint between relatively moving parts, a plate having a contact face formed in substantially a true plane, a retainer held in the one said part and retaining said plate floatingly therein free from stress tending to distort the contact face thereof, a resilient tube mounted at one end on the other said part and extending toward said plate, and a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

7. In a seal for the joint between the relatively moving parts, a plate having a contact face formed in substantially a true plane, a retainer held in the one said part and retaining said plate floatingly therein free from stress tending to distort the contact face thereof, the outer edge of the one said part being peened over to lock said retainer in position and the inner edge of said retainer being peened over said plate to limit the movement thereof, a resilient tube mounted at one end on the other said part and extending toward said plate, and a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant.

8. In a seal for the joint between relatively moving parts, a plate having a contact face and being floatingly mounted in the one said part to preserve the face in substantially a true plane, a resilient tube mounted at one end on the other said part and extending toward said plate, a ring having a contact face and being attached to the free end of said tube to hold the face of said ring into contact with the face of said plate, the contacting faces of said plate and said ring being so finished that the surfaces thereof deviate from a perfect plane by an amount not greater than 20/100,000 of an inch whereby the faces at no point are spaced from each other by an amount more than sufficient to accommodate a substantially mono-molecular film of a lubricant, and means for interlocking said other part and said ring for preventing rotational movement and permitting axial movement thereof.

JOHN A. MINER.